Figure 1:
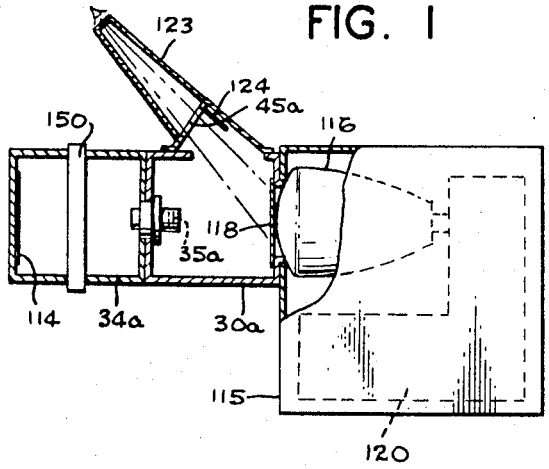

Oct. 4, 1966     E. B. MARJORAM ET AL     3,277,240

FILTER MEANS FOR CAMERA-OSCILLOSCOPE ASSEMBLY

Original Filed Nov. 7, 1961

INVENTORS
ERNEST B. MARJORAM
ARTHUR M. HEDGLIN
BY

ATTORNEY 3,277,240
FILTER MEANS FOR CAMERA-OSCILLOSCOPE
ASSEMBLY
Ernest B. Marjoram, West Covina, and Arthur M. Hedglin, Fullerton, Calif., assignors to Beattie-Coleman, Inc., Anaheim, Calif., a corporation of California
Original application Nov. 7, 1961, Ser. No. 150,696, now Patent No. 3,118,360, dated Jan. 21, 1964. Divided and this application Nov. 12, 1963, Ser. No. 322,720
6 Claims. (Cl. 178—7.86)

This invention relates to photographic recording of cathode-ray tube (CRT) traces and, more particularly, pertains to improvements in a camera assembly for use with a cathode-ray tube. This application is a division of our copending application Ser. No. 150,696, filed November 7, 1961, entitled "Camera Assembly," now Patent No. 3,118,360.

Typically such an assembly comprises a camera with a removable film adapter and a housing or dark box which encloses the space between the camera and the CRT screen. Since the housing is clamped to the CRT to support the camera, it is commonly termed a clamp housing.

The problem to which the invention is directed arises from the necessity of providing a viewing port in the clamp housing for the purpose of observing phenomena on the CRT screen, the problem being to prevent ambient light from causing loss in quality in the film image of the CRT phenomena. Degradation of the film image arises from two causes, first, reduction in contrast of the CRT image itself by ambient light and, second, fogging of the film in the camera by ambient light and ambient light reflections inside the clamp housing. In addition to ambient light entering the viewing port, light is created within the assembling itself by the electronic components of the CRT.

Orange or green filters are commonly placed across the CRT screen and have also been placed across the viewing port. Such an arrangement is of only limited utility, however, and permits the viewing port to be open only for brief periods without seriously affecting the quality of the photographs.

The present invention solves this problem by using two polarizing filters that polarize light in opposite or canceling respects. One polarizing filter is placed across the viewing port and the other is placed at the camera lens. It has been found by tests that a safe ratio between the illumination of the CRT screen and the environmental or ambient light for exposures up to five seconds is 1000 to 1. At this ratio the film produces a satisfactory image of the CRT screen without the ambient light reaching the threshold of response of the film. Using a pair of 32% transmission linear polarizing filters with their polarizing axes at right angles for maximum extinction produces a ratio of 6000 to 1. A pair of 22% transmission filters results in 0.0005% extinction and produces a ratio of 44,000 to 1. The two polarizing filters not only permit the viewing port to be open for long periods of time but also make it possible to eliminate the usual "periscope." The viewing port may be large enough for observing the whole area of the CRT screen and more than one person can view the CRT phenomena simultaneously.

The various features and advantages of the invention may be understood by reference to the following detailed description and the accompanying drawings.

Figure 2:
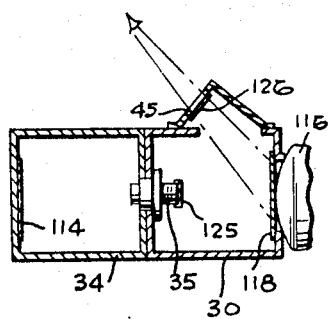

In the drawings, which are to be regarded as merely illustrative:

FIG. 1 is a diagrammatic sectional view of a conventional camera assembly to make clear the problems involved; and FIG. 2 is a diagrammatic sectional view showing how the invention provides a pair of polarizing filters or screens to make possible the elimination of the usual periscope on the clamp housing and to make is possible to keep the viewing port open for long periods of time.

The advantage of using the two polarizing screens may be understood by referring to FIG. 1 which shows diagrammatically a camera 34a with a lens 35a and containing a film 114. The camera 34a is mounted on the casing 115 of a cathode-ray tube 116 by means of the usual clamp housing 30a. A graticule 118 placed in front of the screen of the cathode-ray tube provides ruled lines for the background of the phenomena on the screen. The cathode-ray tube casing 115 contains the usual amplifier 120 equipped with vacuum tubes and also contains lamps 122 to illuminate the graticule.

The clamp housing 30a is provided with the usual viewing port 45a which is enclosed by a "periscope" 123 of yielding rubber-like material which is intended to make close contact with the operator's face to keep light out of the clamp housing. When necessary a flap 124 is swung downward to close the viewing port 45a to keep out the ambient light.

Since the CRT image is an illuminated image, extraneous light falling on the CRT screen lightens the background of the CRT phenomena and thus weakens the image by reduction in contrast. As for the film 114 in the camera, extraneous light entering the lens causes overall fogging and, in addition, ghost images of bright reflections may appear on the film as well as reflections from the metal parts surrounding the cathode-ray tube. These difficulties seriously affect the film even when a single frame of film is exposed only once. When multiple exposures are used to produce multiple photographs on a single film, all of these effects become intolerably accumulative.

The soft rubber periscope 123 is intended to remove these difficulties by cutting off extraneous light. At best, however, it does not make light-proof contact with the observer's face. The observer cannot wear eyeglasses when using the periscope. The observer is limited to a fixed viewing distance and the viewing angle is so narrow as to prevent observation of the full area of the CRT screen. Only one person at a time can use the periscope to observe phenomena on the CRT screen and a further disadvantage is that the operator must remember to close the flap 124 whenever the periscope is not in use.

FIG. 2 shows how, in accord with the teachings of the present invention, the lens 35 of the camera 34 is provided with a polaroid filter 125 and the viewing port 45 is provided with a second polarizing filter 126. The two polarizing filters 125 and 126 polarize the light in opposite respects in the sense that they cooperate for reduction to the minimum of the light that is transmitted through both filters. Thus if linear polarizing filters are employed they are oriented at right angles relative to each other for maximum cooperation to reduce the transmitted light or if the two filters are designed for circular polarization they are selected for polarization in opposite rotary directions. 32% and 22% transmission polarizing filters are both satisfactory.

The environmental light that is admitted to the clamp housing 30 through the polarizing filter 126 is greatly diminished and therefore the contrast on the CRT screen is not significantly reduced. The diminished light admitted to the interior of the clamp housing makes exceedingly weak reflections on metal surfaces around the cathode-ray tube and these weak reflections are diminished by the polarizing filter 125 to an intensity well below the threshold of response of the film 114.

Since the two polarizing screens cooperate to eliminate the necessity for cutting off environment light from the viewing port 45 they not only eliminate the need for the usual periscope 123 but also eliminate the need for a flap to close the viewing port. Since it is not necessary to provide for mounting a closure flap across the inside of the viewing port 45, the viewing port may be widened to substantially the full width of the clamp housing 30. Two or more persons may observe the CRT phenomena through the polarizing screen 126 and each person can choose a preferred viewing distance.

Our description in specific detail of the invention by way of illustration will suggest various changes, substitutions and other departures from our disclosure within the spirit and scope of the appended claims.

We claim:
1. The combination of:
   an enclosure having a viewing port;
   a luminous object in the enclosure;
   a camera directed into the interior of the enclosure to photograph the luminous object;
   a first light-reducing filter intercepting the exterior light that is directed towards the interior of the enclosure through the viewing port,
   and a second light-reducing filter intercepting the light from the interior of the enclosure that is directed towards the film in the camera,
   whereby the first filter permits observation of the luminous object from the exterior of the enclosure through the viewing port without apparent fogging or lowering of contrast of the luminous object and the second filter permits photographing of the luminous object but cooperates with the first filter for reduction by two successive stages of the exterior light that reaches the film, said two filters being polarizing filters with the second filter intercepting a portion of the light from the first filter.

2. A combination as set forth in claim 1 in which the two filters polarize light in opposite or canceling respects.

3. A combination as set forth in claim 1 in which the two filters are linear polarizing filters oriented at approximately 90° relative to each other.

4. A combination as set forth in claim 1 in which the two filters are opposite circular polarizing filters.

5. In an assembly for oscilloscope recording, including a camera and a housing for forming a chamber enclosing both the lens of the camera and the screen of an oscilloscope with the housing provided with a viewing port to permit observation of the screen, filter means for said assembly to prevent extraneous light from effecting the film in the camera while both said port and the shutter of the lens are open, said filter means comprising:
   a first filter transmitting primarily light that is polarized in one respect and positioned at the camera to intercept the light that enters the camera; and
   a second filter transmitting primarily light that is polarized in a different respect, said second filter being positioned to intercept the light that enters said port whereby the two filters cooperate with additive light-reducing effect to minimize the light that both enters said port and reaches the film.

6. A combination as set forth in claim 5 in which said first filter is mounted on the lens of the camera and said second filter spans said port.

References Cited by the Examiner

UNITED STATES PATENTS

| | | | |
|---|---|---|---|
| 2,470,666 | 5/1949 | Suffield | 178—7.85 |
| 2,483,147 | 9/1949 | Mol | 178—7.85 |
| 2,793,361 | 5/1957 | White | 88—65 X |

DAVID G. REDINBAUGH, *Primary Examiner.*

R. L. RICHARDSON, *Assistant Examiner.*